May 27, 1947.  H. G. BUSIGNIES ET AL  2,421,009
DIRECTION FINDING SYSTEM
Filed April 23, 1942  3 Sheets-Sheet 2
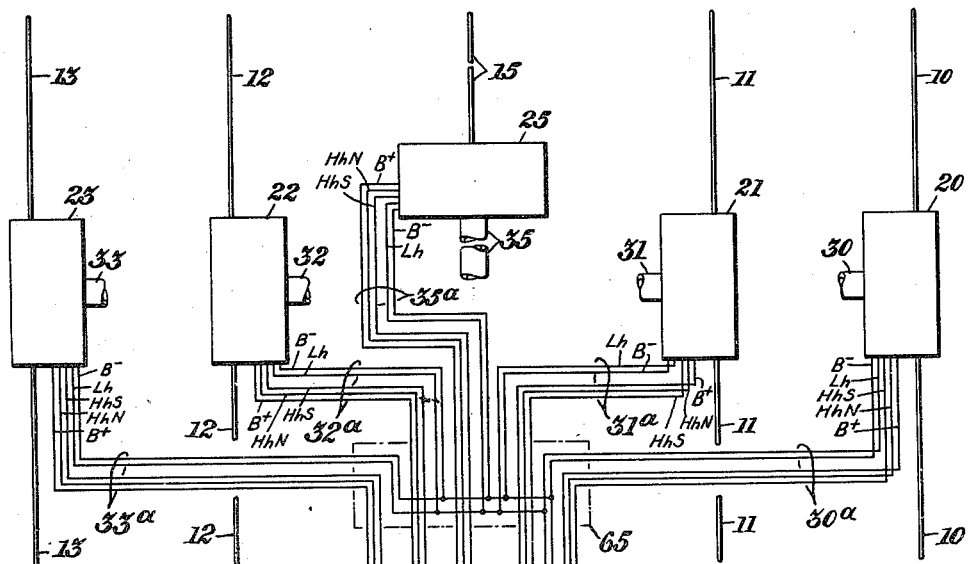
Fig. 2.
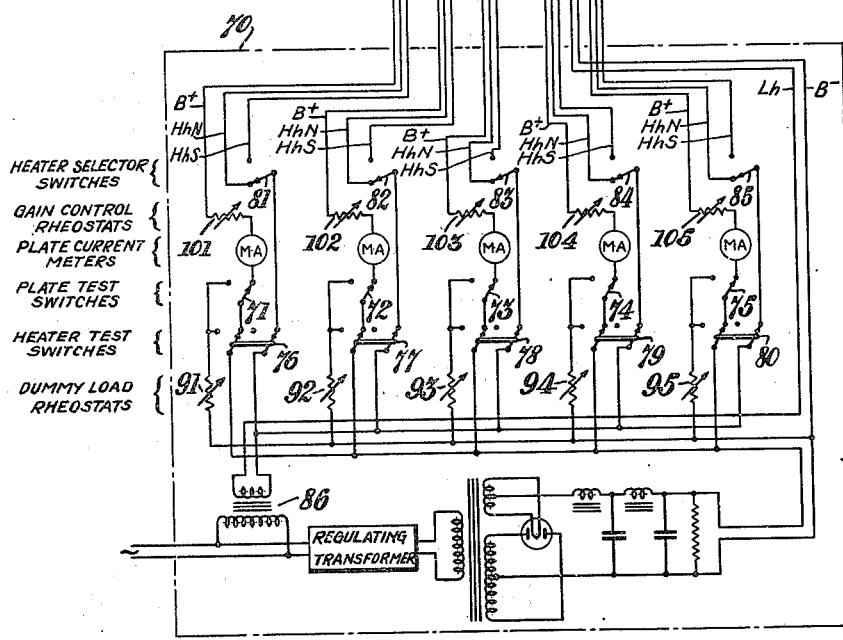
INVENTORS
HENRI G. BUSIGNIES
AVERY G. RICHARDSON
BY Paul R. Adams
ATTORNEY

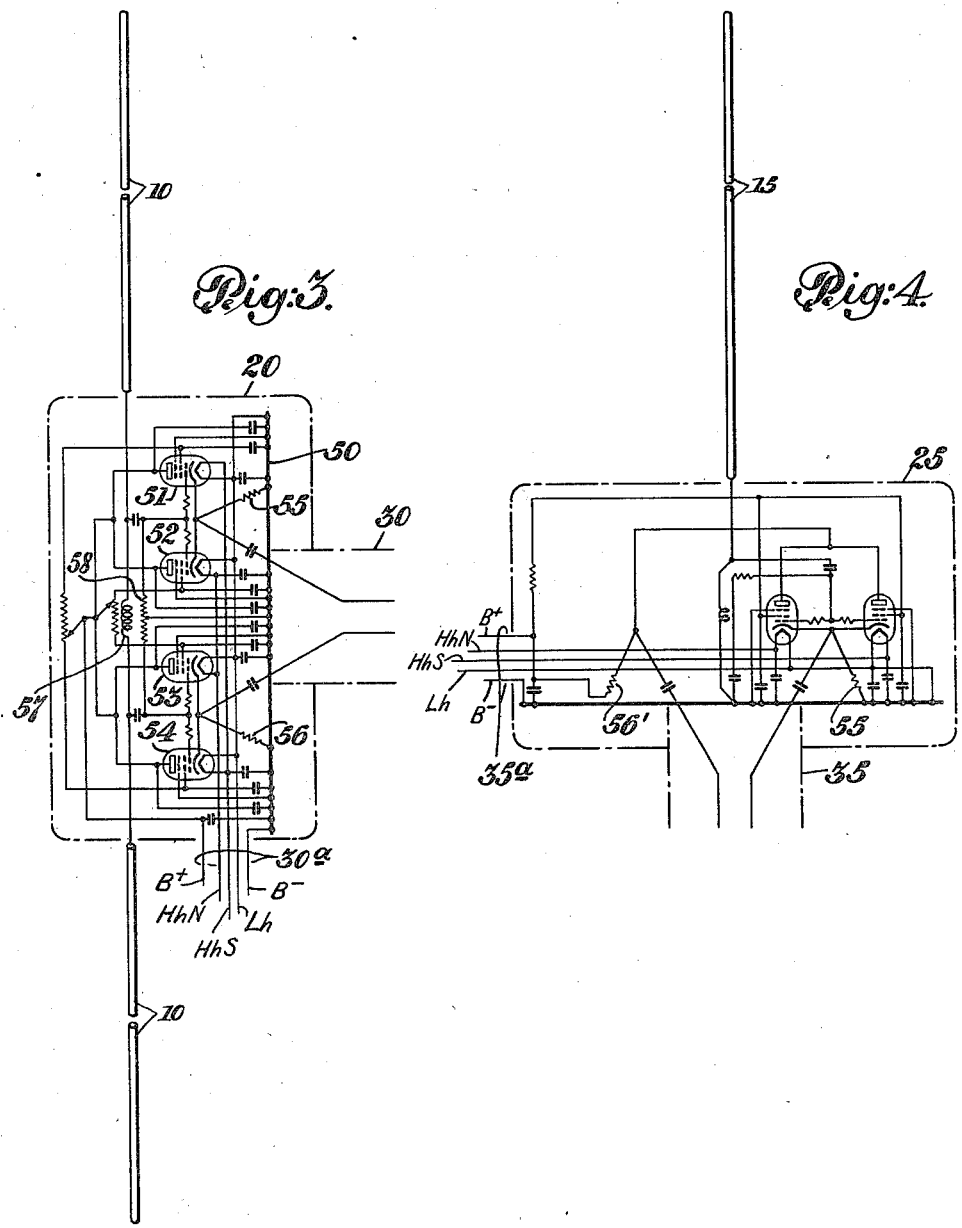

Patented May 27, 1947

2,421,009

UNITED STATES PATENT OFFICE 2,421,009

DIRECTION FINDING SYSTEM

Henri G. Busignies, Forest Hills, N. Y., and Avery G. Richardson, Boonton, N. J., assignors to Federal Telephone and Radio Corporation, a corporation of Delaware Application April 23, 1942, Serial No. 440,154

9 Claims. (Cl. 250—11)

1

The present invention relates to direction finding systems and more particularly to such systems employing directive antenna means comprising a plurality of separate antenna elements.

It is an object of our invention to provide an improved direction finding system of the type wherein a number of antenna elements are arranged in the form of a directive array and disposed remotely from the direction finding receiver.

More particularly, it is an object to provide a system of such type which shall be easily tested for balance of the remote antenna elements and transmission lines.

Still more particularly, it is an object to provide such system wherein the remote antennae may be effectively uncoupled one by one, or by pairs, from the transmission lines so as to facilitate the checking of these antenna elements in respect to balance and proper operation.

Further, it is a particular object of the present invention to provide a direction finding system of the type having remote antennae which shall be operable over a broad band of frequencies and shall be capable of giving clear and accurate sense indications in respect to every frequency of said band.

It is a further object to provide a system of such type wherein the signals delivered from the sense antenna to the receiver have a substantially constant phase relationship to the signals delivered from the directive antenna to the receiver independent of variations of frequency within a wide band.

More particularly, it is an object to attain the above mentioned result in a direction finding system of the "Adcock" type wherein the directive antenna is an array of four dipoles or monopoles connected in pairs to transmission lines which extend to the receiver, while the sense antenna is connected to a separate transmission line extending to the receiver.

In particular, it is an object to attain such result in a system of the type wherein the directive array is an array of dipoles while the sense antenna is a monopole.

It is a further object of the present invention to provide a direction finding system, of the type wherein the directive antennae are remote from the direction finding receiver, wherein the effective pick-up of each antenna shall be adjustable from a point remote from the antenna.

More particularly, it is an object to provide such a system wherein the effective energy transmission or coupling factor of two antenna elements with respect to one transmission line may be individually varied from a remote point so as to effect balance.

Other objects will be pointed out and will be clear from the description of apparatus taken together with the annexed drawings in which Fig. 1 is a diagrammatic perspective view of a direction finding system embodying the invention.

Fig. 2 is a schematic representation of the low frequency circuits of the system of Fig. 1.

Figs. 3 and 4 are schematic representations of the circuits of certain coupling amplifiers shown in Figs. 1 and 2.

Figure 1:
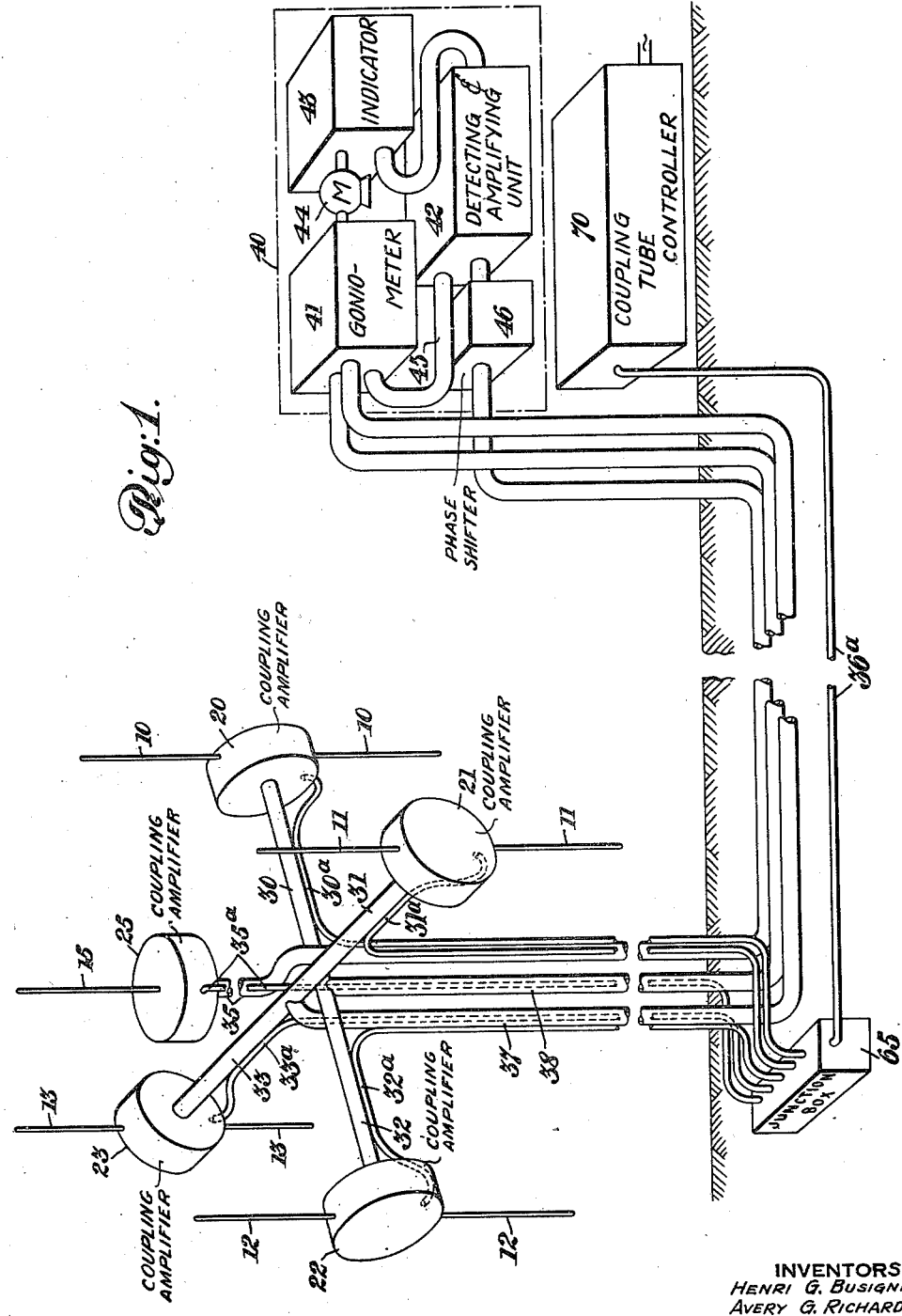

Referring more particularly to Fig. 1, the four dipoles 10, 11, 12, 13 are disposed in a square to form a so-called H type Adcock array. These antennae are coupled through coupling means 20, 21, 22, 23 to the four high-frequency transmission lines 30, 31, 32, 33, the two transmission lines 30 and 32 being joined to the single long transmission line 38 and the two transmission lines 31 and 33 being similarly joined to the long transmission line 37. The two long transmission lines 37 and 38 extend to the direction finding receiver 40. For sensing purposes a fifth antenna element 15 is provided, this element 15 being a monopole rather than a dipole and being coupled through coupling device 25 to a transmission line 35 which extends directly to the direction finding receiver 40.

The direction finding receiver 40 may be of a known type suitable for operating with fixed antennae. It may, for example, be of the type described in the copending application of Henri G. Busignies, filed March 6, 1941, Serial No. 381,936, for Distorting direction finder receiver. Such direction finder receiver principally comprises a motor-driven quadrantal variocoupler or goniometer 41, a detecting and amplifying unit 42 and an indicator 43 which is driven by the same motor 44 that drives goniometer 41.

In receiver 40 the waves delivered over transmission lines 37 and 38 from the directive array 10—13 are fed to the goniometer 41, being applied in well-known fashion to the usual crossed stators (not shown). The output of the goniometer (taken in conventional fashion from a rotating search coil—not shown) extends via a high frequency transmission line 45 to the detecting and amplifying unit 42. The waves delivered over transmission line 35 from the sending antenna 15 extend via phase shifting unit 46 to the detecting and amplifying unit 42, in which they are mixed with the signals arriving over line 45 from the goniometer.

The phase shifter 46 is preferably a somewhat aperiodic circuit capable of giving a phase shift of the order of 90° to any frequency within a rather wide band. A preferred form for the phase shifter 46 is an artificial line of such length as to give a 90° phase shift for the mean frequency of the band to be handled. If the band width is only one octave the artificial line may, for example, be arranged to give a phase shift of 60° at the lowest frequency in the band and a phase shift of 120° at the highest frequency of the band, thus being within 30° of a quadrature phase shift for all frequencies. If a more accurate quadrature phase shift is desired or a wider band is to be handled, an artificial line whose output is taken from a movable coil may be employed, the movable coil being arranged to be ganged with the tuning means of the detecting and amplifying unit 42 so as to be shifted when the latter is tuned. Such an arrangement is described in more detail in our copending application Serial No. 404,998, filed August 1, 1941, for Direction finding systems.

The signals coming from the output of phase shifter 46 are mixed with the signals arriving over the transmission line 45 from the goniometer for sensing purposes. Preferably, the signals from 46 are not used during the determination of the accurate "line of direction" but are added to the signals from 45 in response to the operation of an appropriate switch only when it is desired to determine the general sense of the signals whose "line of direction" has been found. The means for mixing the signals from 46 with those from line 45 as well as the actuating switch for causing such mixing when sensing is desired are not shown, being understood as included in detecting and amplifying unit 42. The output from unit 42 is applied as shown to indicator 43 which may be of any known type but is preferably of the type described in our copending application Serial No. 404,998 above mentioned.

As described so far the apparatus is generally of conventional type except for the use of a monopole sensing antenna 15 with the dipole or H type Adcock directive antenna.

The coupling devices 20, 21, 22, and 23 which were merely mentioned above without detailed description are illustrated in Fig. 3. As will be seen from this figure each coupling unit contains four vacuum tubes 51, 52, 53, and 54, the two tubes 52 and 53 being normally used as a push-pull amplifier, and the two tubes 51 and 54 serving as standby tubes to be used in place of tubes 52 and 53. The push-pull amplifier comprising the tubes 52 and 53 is of the so-called "cathode follower" type wherein the output load resistors 55, 56 are in the cathode leads common to the grid-cathode and plate-cathode circuits. As is well known such "cathode follower" circuit produces a very large amount of negative feedback so that the voltage gain is less than unity. By virtue of this same large amount of negative feedback, however, the apparent output impedance of the amplifier is made quite small and thus may be quite accurately matched to the surge impedance of the associated line (e. g. of line 30 in the case of amplifier 20). The result is that the amplifier may produce a substantial power gain in spite of the fact that its voltage gain is less than one. In copending application of Henri G. Busignies, Serial No. 384,670, filed March 22, 1941, for Radio receiving system, the advantages of using the "cathode follower" type of amplifier ahead of the first stage of any receiver for high frequencies are set forth:

In accordance with a feature of the present invention still further advantages are obtained by arranging the "cathode follower" type of amplifier so as to serve as a remotely controllable antenna cut-off means to facilitate isolation of the different antennae for testing purposes. As one subdivision of this "antenna cut-off feature" the anode biasing connections of the five amplifiers are arranged so that at least one conductor per amplifier (represented as lead B+ in Fig. 3) is run individually from each separate amplifier to control unit 70 adjacent the receiver as shown in Fig. 2, and individual test switches 71, 72, 74, 75 in unit 70 are arranged to individually cut off the anode voltage of the different amplifiers 20, 21, 22 and 23, thus effectively uncoupling the corresponding antennae from the transmission lines extending to the receiver. As best seen in Figs. 2 and 3 the five B+ leads from the amplifiers 20, 21, 22, 23, 25 extend in five separate cables 30a, 31a, 32a, 33a, 35a to a junction box 65 and then run as five separate wires in cable 36a to control unit 70.

In accordance with another subdivision of the antenna cut-off feature of the invention the heater supply voltages are also extended individually to the separate amplifiers 20, 21, 22 and 23; and test switches 76, 77, 79 and 80 are provided for individually opening these heater circuits. The opening of the heater circuits serves to isolate the antenna still more effectively than would the cutting off of the plate voltage, since with the heaters lighted and the plate voltage cut off the grid and cathode together form a diode and therefore some transmission may take place from grid to cathode via the electron conduction path between the electrodes.

In accordance with a further provision of the present invention each of the amplifiers is provided with a complete standby set of tubes (e. g., tubes 51 and 54 of amplifier 20 in Fig. 3) and in accordance with a feature of the invention these tubes are connected in the amplifier circuit in parallel with the normal tubes. Due to the large amount of negative feedback existing in the circuit the permanent connection of the standby tubes in parallel with the normal tubes is found to have no harmful influence. Moreover, it has been found that by connecting the tubes in this manner it is possible to substitute the standby tubes for the normal tubes merely by controlling the heater voltages. Thus, in accordance with still another feature of our invention the heater connections for the normal and standby tubes in any one amplifier are separate from each other and selector means 81—85 are provided at the control unit 70 for selecting which set of heaters shall be activated.

In the preferred embodiment shown, the heater leads of any one amplifier have one side commoned and grounded to ground plate 50 (see Fig. 3), this common "low" heater lead being designated $L_h$ in Figs. 2, 3 and 4. The opposite ungrounded or "high" heater leads are brought out to separate conductors, the high heater leads of the normal tubes 52, 53 being brought out to conductor $H_hN$ while those of the standby tubes are brought out to conductor $H_hS$. These leads are then run individually to the control unit 70 as shown in Fig. 2, so that ten separate leads (for the "high" sides of the normal and standby heaters of the five amplifiers) are controlled by the five switches 81—85. It will be clear therefore that the illustrated embodiment employing eleven heater conductors extending from the amplifiers 20—25 to unit 70 presents the advantage of being able to change over from normal to spare amplifiers remotely and also the advantage of being able to disable the amplifiers one at a time by extinction of their heaters.

These advantages can also be attained with fewer conductors by isolating the $L_h$ lead of each amplifier from the ground plate 50 via a blocking condenser while commoning the five $H_hN$ leads and similarly commoning the five $H_hS$ leads. Then the leads $L_h$ could be run separately from each amplifier making a total of seven heater leads extending to the control unit 70. By activating one or the other of the two leads $H_hN$, $H_hS$, changeover from normal to standby amplifiers could be effected while the disabling of individual amplifiers could be effected by interrupting individual leads $L_h$. The arrangement as shown in Figs. 2 and 3, wherein eleven separate leads extend to the control unit 70, is preferred however, since this enables some of the amplifiers to be operated upon their normal tubes while others are operated upon their standby tubes.

Attention is called to the fact that three separate conductors extend from the ground plate 50 of each amplifier to the receiving station as will be seen by comparison of Figs. 1, 2 and 3. One of these conductors is the sheath of the corresponding high frequency line (e. g., lines 30 and 38 in the case of amplifier 20). Another conductor is the conductor $L_h$ above referred to, the conductor $L_h$ of amplifier 20, for example, being run inside of cable 30a to junction box 65, then joined to the other $L_h$ conductors in this box (see Fig. 2), and being then brought in cable 36a to unit 70 where it connects to the otherwise ungrounded secondary of the filament heating transformer 86. The third conductive connection from ground plate 50 is the conductor B— which in the case of amplifier 20 extends individually within cable 30a to the junction box 65, being there joined with those of the other amplifiers and then brought in cable 36a to unit 70.

In accordance with a feature of the present invention the plate test switches 71—75 are so arranged that upon cutting off the plate voltage from any amplifier a dummy load (e. g., 91, 92, 93, 94, or 95) is connected up in place of the amplifier plate load so as not to disturb the voltage supply to the other amplifiers. In accordance with another feature of the present invention each of the heater test switches 76—80 is also arranged to perform a similar connecting-up of a dummy load when thrown to the left for cutting off the heaters of its associated amplifier. Preferably each heater switch also cuts off the plate voltage to avoid over-loading the B supply during the first few seconds after the switch is thrown to the left. These features are of great value in insuring that the turning on and off of any one or two amplifiers shall not affect the gain of the remaining amplifiers.

The provision of the plate test switches 71—75 enables a rapid check of the gains of the different antennae to be quickly made by rapidly turning on and off the different amplifiers. By the use of these plate test switches the operator avoids the substantial delays (sometimes amounting to several minutes) required for reaching stable conditions after turning on and off heater currents; and good comparative results are obtained even though the antennae are not completely uncoupled. By the use of the heater test switches 76—80 the amplifiers are rendered more completely ineffective so that the corresponding antennae are substantially fully cut off from their transmission lines. When these switches are used a substantial time is required for cooling off and warming up the heaters and therefore the comparisons cannot be made as rapidly as with the test switches 71—75. Because of the elimination of diode effect, however, the tests when made can be more accurate.

It is contemplated that the plate test switches 71—75 will be used principally for quickly determining whether or not the four antennae 10—13 are approximately equal in their effective energy pick-up. Such test is ordinarily made after the antennae have once been carefully lined up and balanced, and serves to indicate whether or not some one of the antennae has become substantially altered by enemy gunfire or other accident. For performing such a rough test a small portable transmitter may be located in any convenient direction at a substantial distance from the antenna array or, in most cases, some existing signal which is essentially constant in volume may be used. In either case the plate test switches 71—75 are turned off and then are turned on, one at a time, and the magnitude of the indication given by the indicator 43 or by a plate current meter in the detecting and amplifying unit 42 is used as a measure of the signal energy delivered by the antennae. When connected up, one at a time, the antenna should give equal amplitude signals.

The heater test switches 76—80 are intended to be used in carefully lining up the installation when it is first installed in a new location or, in the case of permanent installations, at intervals of say once a month or once a week. For such careful alinement a portable transmitter is first placed at a substantial distance from the antennae and on the line through dipoles 11 and 13, and the amplifier units 20 and 22 are rendered effective by throwing switches 80 and 77 to the right as shown in Fig. 2, the remaining switches 76, 78 and 79 being thrown to the left to disable the remaining amplifiers. The two dipoles 10 and 12 should now receive signals of equal magnitude and opposite phase, and the resultant signal transmitted over high frequency line 38 to the receiver 40 should be zero. If this signal is not zero the gain of the amplifiers 20 or 22 should be adjusted until such signal becomes exactly zero. The disconnection of antennae 11 and 13 during this adjustment greatly facilitates the adjustment by eliminating the delivery of signals over line 37. After this adjustment has been completed a similar test and adjustment may be made with respect to the antennae 11 and 13, the transmitter being moved to a position in line with these antennae.

In accordance with a further feature of the present invention the adjustment of the gains of the different amplifiers may be remotely varied from the unit 70. For this purpose the gain control rheostats 101, 102, 103, 104, 105 are provided in series with the individual B+ conductors extending to the different amplifiers. Such rheostats are particularly useful in conjunction with the test switches, but even without such adjustable gain control rheostats 101—105 the test switches 71—75 and 76—80 will be found to be of great utility, since the checking of the antennae can be effected remotely even if the adjustment thereof cannot.

Fig. 4 illustrates the circuit of the amplifier unit 25 which couples the sensing antenna 15 to its associated transmission line 35. As will be clear from Fig. 4 this amplifier is essentially similar to the other amplifiers (such as illustrated in Fig. 3) with approximately half of their equipment eliminated. Amplifier 25 is a single tube amplifier, the two tubes shown in Fig. 4 being provided for normal and standby operation respectively. In order to obtain a symmetrical output the two conductors of high frequency transmission line 35 are connected respectively to cathode load resistor 55 (exactly corresponding to the similarly numbered cathode of Fig. 3) and to an anode load resistor 56' (which takes the place of the second cathode resistor 56 of Fig. 3).

Preferably, the resistors 55 and 56' are so chosen that the effective signal delivered to the two conductors of line 35 will be the same. For this purpose the resistors 55 and 56' should be approximately equal.

The five low frequency conductors B+, HhN, HhS, Lh and B— which extend out from the side of amplifier 25 within cable 35a correspond exactly to the similarly designated five wires extending from each of the amplifiers 20—23 in cables 30a—33a, and in the manner of connection of these wires is exactly analogous to the manner of connection to the other wires as shown in Fig. 2.

By the provision of aperiodic coupling amplifier 25, as well as the provision of the corresponding coupling amplifiers for the dipoles 10—13, there is attained the new and useful result that the signals from the antenna 15 arrive at the receiver 40 in a fairly definite phase relation to the signals from the four directive antennae. Ordinarily in direction finding systems which are intended to operate over a wide band of frequencies of the order of an octave or more the phase relation of the signals of the sensing antenna to the signals of the direction array varies in an extremely erratic manner with frequency thus rendering the sensing indications unreliable. Such erratic variations arise from two causes: First, the coupling transformers ordinarily employed for matching the dipole antenna elements in their lines are in themselves characterized by resonance effects giving rise to large phase shifts in these transformers. Second, the transformers do not accurately match the antenna impedance to the surge impedance of the line at all frequencies in the band and therefore very substantial reflections occur at the ends of the horizontal transmission lines. These reflections may for certain phase relationships be further intensified at the T junction point where the horizontal transmission lines join the long vertical line leading to the receiver and thus the effective reflection coefficient at this T junction point as seen from the receiver may, for some frequencies, be very large, being more than 80% in many cases.

By the effective reflection coefficient at the T junction as seen from the receiver is meant the overall reflection coefficient of the T junction taken together with everything on the antenna side thereof. In other words, if one assumes that a 1-volt wave as applied to the line (by a generator substituted in place of the receiver for test purposes) the fraction of a volt which is returned toward the generator from the T junction (as a result of reflections at this junction combined with reflections from all other points of discontinuity beyond the junction) is herein called the effective reflection coefficient at the junction as seen from the receiver.

Thus any waves reflected from the receiver and traveling back to the T junction point may be again reflected downward with reflection coefficients of 80% or more to be again reflected up from the receiver. The effect of such multiple reflections will depend very greatly upon the length, in terms of wave lengths, of the long transmission line between the T junction and the receiver, as well as upon the phase angles of the reflection coefficients at the T junction and at the receiver. Under adverse conditions with effective coefficients at the receiver and at the T junction of 80% each, the resultant phase of the waves arriving at the receiver end of the line may vary by more than 80° depending upon the exact number of wave lengths in the long transmission line between the T junction and the receiver. In the presence of such large erratic phase shifts the problem of so phasing the sensing antenna energy as to bring it into substantial coincidence with the energy from the directive array becomes impracticable.

In accordance with the present invention it is, for the first time, possible to operate over a broad band of frequencies (e. g., a band of ⅔ of an octave or more) while still maintaining a substantially fixed phase relationship between the signals delivered to the receiver 40 from the sensing antenna 15 and those delivered thereto from the other antennae.

Preferably, the monopole antenna 15 is elevated sufficiently above the other antennae so that transmission line 35 has about the same length as transmission line 30 plus transmission line 38, or transmission line 31 plus transmission line 37.

By virtue of the essentially aperiodic nature of the amplifier type coupling units employed, in accordance with the present invention, two of the principal problems involved in sense indications of a broad band direction finder are solved: In the first place, the phase shift within the coupling unit itself is small, being due almost wholly to the tuning coil 57 which tunes the antenna. In the second place, the apparent impedance of the coupling unit as seen from the associated transmission lines (such as 30, 31, etc.) is matched to the surge impedance of these lines accurately for all frequencies in the band. If therefore the surge impedance of the horizontal transmission lines (such as 30, 31, etc.) is made approximately twice the surge impedance of the lines extending from the T junctions to the receivers, a perfect matching of the whole transmission system can readily be effected so far as the antenna end thereof is concerned.

If any mismatch now exists at the receiver end (i. e., where the long transmission lines join the receiver 40), such mismatch will not produce any deleterious effects, except a reduction in power delivered to the receiver. It is true that the waves reflected from the receiver will set up standing waves, but these standing waves will be independent of the exact length of the transmission line in wavelengths. The energy reflected from the receiver will not be again reflected at the antenna end of the transmission line if this line is properly matched at the antenna end as above assumed; and therefore no repeated reflections giving rise to an erratic phase shift changing rapidly with small changes in frequency can occur. The phase of the energy arriving at the receiver end of the transmission line will be wholly unaffected by the waves reflected from the receiver.

In some cases it may be preferred to make the horizontal transmission lines 30, 31, etc., of the same surge impedance as the longer transmission lines extending to the receiver. When the surge impedance of these lines are equal, a 33⅓% reflection coefficient will exist at the T junction. By virtue of the fact that there is no reflection at the ends of the horizontal transmission lines where these meet the coupling units however, the effective resultant reflection coefficient at the T junction as viewed from the receiver is the same as the actual coefficient of this junction. Thus no large erratic phase shift can possibly occur even if the receiver is very greatly mismatched. Assuming, for example, that the receiver is 80% mismatched to its line, the maximum variation of phase which can be produced by multiple reflections as the length of the transmission lines from the T junction to the receivers are varied, will be plus or minus 15½°. Since the line coupling the sense antenna to the receiver does not have any T junction there will not be any phase variation produced by reflections in the energy arriving over this line no matter how great the reflection coefficient at the receiver. Thus the relationship between the energy arriving from the sensing antenna and the energy arriving from the directive antenna will be reasonably fixed having an erratic variation due to reflections of not more than plus or minus 15½° for an 80% reflection coefficient at the receiver. By providing a reasonably aperiodic 90° phase shifter 46, as previously described, the sensing energy can be reliably combined in predetermined aiding or opposing relationship with the energy from the directive antenna, and the relationship will not reverse from aiding to opposing by virtue of a change in the frequency being received.

Although the preferred embodiment of the invention illustrated in Figs. 1-4 is arranged with the B— conductors grounded and commoned and with the plate test keys connected to the individual B+ conductors, an inverted arrangement with individual B— conductors and a common B+ lead would also be possible. For such arrangement each B— could be insulated from ground by a by-pass condenser, but still galvanically connected to the cathode resistors 55 and 56, the center tap of grid leak resistor 58, and the suppressor grids of the tubes 51—54, all these points being galvanically insulated from ground but adequately by-passed thereto. The five individual B— leads could then be run separately to the control unit 70 and there extended through plate test switches 71—75 while the B+ leads could be galvanically commoned. Such inverted arrangement might, for instance, be preferred if it were considered desirable to ground the positive terminal of the B supply source for reasons of corrosion prevention. Ordinarily, however, the arrangement shown wherein the B— is grounded and commoned and the B+ conductors are individually controlled by the test keys is preferred.

Although we prefer to use indirectly heated cathodes, directly heated filaments might be employed by inserting suitable chokes to isolate the filaments from ground with respect to R. F. currents. It should, therefore, be understood that when reference is made to a "cathode surface" excited for emission by heating means, such expression is to be construed to include the surface of a self-heated filament.

It will be apparent that the general principles of our invention are applicable to types of antenna arrays other than the H type Adcock consisting of four dipoles. Four monopoles may, for example, be used thus forming a so-called crossed U Adcock in place of a crossed H Adcock. In such case the coupling units could all be of the form shown in Fig. 4. It should be noted that in such system only one tube would be required to couple each antenna element to its line. Alternatively, a pair of dipoles or monopoles might be used to form a half Adcock array which would then be physically rotated instead of being coupled to a goniometer which is rotated.

In addition, it should be noted that the power supply equipment which in Fig. 2 is represented as being in the same unit 70, which contains the test switches, could be separate from such unit. Thus, for example, the power supply might be arranged on a truck some distance from the receivers while the control unit 70 could be located close to the receiver 40, or even a small distance away from the latter. In any case, however, it is desirable that the test switches should be reasonably conveniently located with respect to the receiver so that manipulation of the switches can conveniently be combined with reading of the indicator 43 or of the plate meters (not shown) of unit 42.

Although certain embodiments of our invention have been shown and described for purposes of illustration it is to be understood that many modifications, additions and omissions may be made within the scope of the invention as defined by the appended claims.

What we claim is:

1. A direction finding system comprising a plurality of antenna elements arranged in a directive array, a direction finder receiver disposed at a distance from said antenna elements, a plurality of high frequency transmission lines smaller in number than the number of said elements extending from said receiver to said elements, a plurality of vacuum tube amplifiers connected to couple each of said elements to one of said lines, at least two different ones of said elements being thereby coupled to a given one of said lines, means for supplying operating power to said amplifiers said means including separate conductors extending between the individual amplifiers and a remote control point, and switch means at said control point for individually opening said conductors to separately disable said amplifiers.

2. A system according to claim 1 wherein said conductors carry heater current for said amplifiers.

3. A system according to claim 1 wherein said conductors carry anode biasing current for said amplifiers.

4. A direction finding system according to claim 1, wherein said receiver comprises a goniometer, a detecting unit and a phase shifting unit, and wherein said certain ones of said lines are connected via said goniometer to said detecting unit and wherein said other of said lines is connected via said phase shifter to said detecting unit.

5. A direction finding system according to claim 1 wherein each of said amplifiers comprises feedback means for rendering the output impedance thereof substantially matched to the surge impedance of said lines.

6. A direction finding system comprising a plurality of antenna elements arranged in a directive array; a further sensing antenna element adjacent said array; a direction finder receiver disposed at a distance from said antenna elements; high frequency transmission lines extending from said receiver to said elements; a plurality of substantially aperiodic vacuum tube amplifiers coupling said first mentioned elements to certain ones of said lines; a further substantially aperiodic vacuum tube amplifier coupling said additional antenna element to another of said lines; and each of said amplifiers comprising negative feedback means for rendering the output impedance thereof substantially matched to the surge impedance of said lines.

7. A direction finding system comprising a plurality of antenna elements arranged in a directive array; a further sensing antenna element adjacent said array; a direction finder receiver disposed at a distance from said antenna elements; high frequency transmission lines extending from said receiver to said elements; a plurality of substantially aperiodic vacuum tube amplifiers coupling said first mentioned elements to certain ones of said lines; a further substantially aperiodic vacuum tube amplifier coupling said additional antenna element to another of said lines; each of said certain ones of said lines comprising a long portion extending from said receiver to a point adjacent said elements and two further short portions branching from said long portion to two of said elements; the surge impedance of such short portions being substantially double that of said long portion; negative feedback means in each of said plurality of amplifiers for rendering the output impedance thereof substantially equal to the surge impedance of said short portions; and negative feedback means in said further amplifier for rendering the output impedance thereof substantially equal to the surge impedance of said other of said lines.

8. A direction finding system comprising a plurality of antenna elements arranged in a directive array; a further sensing antenna element adjacent said array; a direction finder receiver disposed at a distance from said antenna elements; high frequency transmission lines extending from said receiver to said elements; a plurality of substantially aperiodic vacuum tube amplifiers coupling said first mentioned elements to certain ones of said lines; a further substantially aperiodic vacuum tube amplifier coupling said additional antenna element to another of said lines; each of said certain ones of said lines comprising a long portion extending from said receiver to a point adjacent said elements and two further short portions branching from said long portion to two of said elements; and negative feedback means in each of said plurality of amplifiers for rendering the output impedance thereof substantially equal to twice the surge impedance of said long portion.

9. A direction finding system comprising a plurality of antenna elements arranged in a directive array, a receiver disposed at a distance from said antenna elements, a high frequency transmission line extending from each of said elements to said receiver, substantially aperiodic vacuum tube amplifiers coupling each of said elements to its associated transmission line, negative feedback means for rendering the output impedance of each amplifier substantially matched to the surge impedance of said associated line, each amplifier comprising a pair of thermionic tubes, one of said tubes being arranged as a spare for the other, power supply means for said tubes, and means located at said receiver to control the supply of energy from said power supply means to said tubes.

HENRI G. BUSIGNIES.
AVERY G. RICHARDSON.

REFERENCES CITED

The following references are of record in the file of this patent:

UNITED STATES PATENTS

| Number | Name | Date |
| --- | --- | --- |
| 2,174,016 | Sullinger | Sept. 26, 1939 |

FOREIGN PATENTS

| Number | Country | Date |
| --- | --- | --- |
| 427,674 | Great Britain | Apr. 29, 1935 |
| 439,714 | Great Britain | Dec. 12, 1935 |